(12) United States Patent
Ford et al.

(10) Patent No.: US 7,055,856 B2
(45) Date of Patent: Jun. 6, 2006

(54) AIRBAG MODULE FOR SELECTIVELY VENTING AIRBAG INFLATION GAS

(75) Inventors: Brian Ford, Mt. Clemens, MI (US); Joel Jerrim, Grand Blanc, MI (US); Rolf Sawall, Frankfurt (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 10/359,256

(22) Filed: Feb. 6, 2003

(65) Prior Publication Data

US 2004/0155442 A1 Aug. 12, 2004

(51) Int. Cl.
 *B60R 21/26* (2006.01)
(52) U.S. Cl. ...................................................... 280/736
(58) Field of Classification Search ................ 280/739, 280/740, 741, 742, 736, 738
See application file for complete search history.

(56) References Cited

U.S. PATENT DOCUMENTS

| | | | | |
|---|---|---|---|---|
| 5,695,214 A | * | 12/1997 | Faigle et al. ................ | 280/735 |
| 5,707,078 A | | 1/1998 | Swanberg et al. | |
| 5,709,405 A | * | 1/1998 | Saderholm et al. .......... | 280/736 |
| 6,065,773 A | * | 5/2000 | Klinger et al. ............... | 280/736 |
| 6,213,502 B1 | * | 4/2001 | Ryan et al. ................... | 280/736 |
| 6,409,213 B1 | * | 6/2002 | Webber et al. ............... | 280/739 |
| 6,540,257 B1 | | 4/2003 | Magoteaux ................... | 280/739 |
| 6,550,807 B1 | * | 4/2003 | Faigle et al. ................. | 280/739 |
| 6,692,022 B1 | * | 2/2004 | Schenck et al. ............. | 280/739 |
| 2001/0038201 A1 | | 11/2001 | Ryan | |
| 2003/0025309 A1 | | 2/2003 | Schenck et al. | |
| 2003/0025312 A1 | | 2/2003 | Amamori ..................... | 280/739 |
| 2004/0051285 A1 | | 3/2004 | Fischer | |

FOREIGN PATENT DOCUMENTS

| | | |
|---|---|---|
| EP | 1 186 485 A2 | 3/2002 |
| WO | WO 00/71389 A1 | 11/2000 |

* cited by examiner

*Primary Examiner*—Faye M. Fleming
(74) *Attorney, Agent, or Firm*—Lonnie Drayer; Jarett Rieger

(57) ABSTRACT

An airbag module comprises an airbag inflatable through an opening and an airbag inflator in communication with the opening. A block selectively diverts inflation gas away from the airbag opening. The block may move from a first position and a second position, the first position permitting the inflation gas to flow to the opening and the second position deflecting the inflation gas away from the opening.

19 Claims, 6 Drawing Sheets

AIRBAG MODULE FOR SELECTIVELY VENTING AIRBAG INFLATION GAS

BACKGROUND OF THE INVENTION

This invention relates to an airbag module that selectively diverts inflation gas away from an airbag.

Airbag modules typically comprise an airbag and an airbag inflator. When triggered by a crash detection system, the airbag inflator rapidly generates an inflation gas through a chemical or other reaction to inflate the airbag. The inflated airbag serves as a cushion against injury for a vehicle occupant.

The location of the vehicle occupant with respect to the airbag may affect the effectiveness of the airbag as a cushion. If the vehicle occupant is too close to the airbag, the full inflation of the airbag may result in less than optimal cushioning of any impact. Accordingly, it is desirable to inflate the airbag to less than full capacity when the vehicle occupant is too close to the airbag.

Systems exist that detect the location of the vehicle occupant. When these systems sense that the vehicle occupant is too close to the airbag, the airbag is inflated to less than full capacity. A dual-stage inflator serves to inflate the airbag in this way. The inflator's first stage partially inflates the airbag, and when the second stage triggered in addition it inflates the airbag to a maximum level.

However, a dual-stage inflator is generally more expensive than a single-stage inflator. Moreover, these inflators only inflate the airbag to two different levels: a high output level is provided when both stages are utilized, and a low output level is provided by only the primary stage. Having only two different inflation levels for the airbag may not adequately accommodate the multiple positions of the vehicle occupant during a crash. For example, the vehicle occupant may be too close to the airbag during deployment to expand the airbag with the high output, but yet be too far away from the airbag for a low output level inflation. The invention taught herein will allow for virtually any level of airbag inflation.

In addition to altering the inflation level of the airbag due to vehicle occupant position, it may be desirable to inflate the airbag to more than two different levels under different circumstances. For example, the weight of the vehicle occupant affects the level of inflation in a crash because a heavier vehicle occupant requires more cushioning than a lighter vehicle occupant. Also, different levels of crash severity may necessitate a greater range of inflation levels.

A need therefore exists for a simple and inexpensive airbag module that permits an airbag to be inflated to a greater variety of inflation levels.

SUMMARY OF THE INVENTION

The present invention comprises an airbag module having an airbag vent that diverts Inflation gas away from the airbag when the airbag has reached a desired inflation level. Like existing airbag modules, the airbag module taught herein employs an airbag inflator that inflates the airbag with inflation gas transmitted through an opening in the airbag. Unlike these modules, however, a gas flow diverter vents gas away from the opening following the inflation of the airbag to a desired level. The airbag module of the present invention accomplishes this without the need for a dual-stage inflator. Moreover, because the airbag module controls when the gas flow diverter begins venting gas away from the airbag, the gas flow diverter permits the airbag to be inflated to a range of levels rather than just two different levels.

The gas flow diverter may have a first position and a second position. The first position permits inflation gas to flow through the airbag's gas intake opening while the second position diverts inflation gas away from the airbag's gas intake opening. When the gas flow diverter is in the second position, it may serve to seal closed the airbag's gas intake opening. An actuator may selectively move the gas flow diverter between the first and second positions. The actuator may be a device that fires and moves the gas flow diverter from the first position to the second position. In addition, inflation gas from the airbag inflator may assist the gas flow diverter in moving between the first and second positions. The gas flow diverter may comprise a flap that is hinged to move between the first position and the second position. When the gas flow diverter is actuated, inflation gas may pass to a location outside of the airbag rather than to the airbag.

A control unit may dictate when the actuator activates the gas flow diverter. The control unit may be in communication with a sensor, such as a vehicle occupant position or weight sensor, which informs the control unit when to actuate the gas flow diverter. In this way, the airbag may selectively channel gas between two passages: one passage directed to the airbag's gas intake opening and the other passage directed away from the airbag. The actuator moves the gas flow diverter so that inflation gas may pass through either passage as determined by the control unit. Initially, the airbag inflator may channel inflation gas through the first passage to the airbag's gas intake opening to inflate the airbag. When the control unit determines the airbag has received enough inflation gas, such as based on the location of the vehicle occupant, remaining gas from the inflator passes outside of the airbag through the second passage. In addition, an airbag module according to the present invention may employ more than one gas flow diverter. Each gas flow diverter may be separately or collectively actuated to create additional openings to vent the airbag. In this way, a greater variety of airbag deployment and cushioning options are available. For example, one gas flow diverter may be actuated while another gas flow diverter is left unactuated thereby creating a small effective venting area for the airbag. This would create a somewhat hard cushion that would be beneficial to a large vehicle occupant. More than one vent could be opened, increasing the effective vent area for the cushion. This would create a softer cushion that would be beneficial for a smaller vehicle occupant. The invention not only provides a greater range of inflation levels but also provides an increased variety of airbag deployment and cushioning characteristics.

BRIEF DESCRIPTION OF THE DRAWINGS

The drawings that accompany the detailed description are briefly described below.

DETAILED DESCRIPTION OF THE INVENTION

Figure 1:
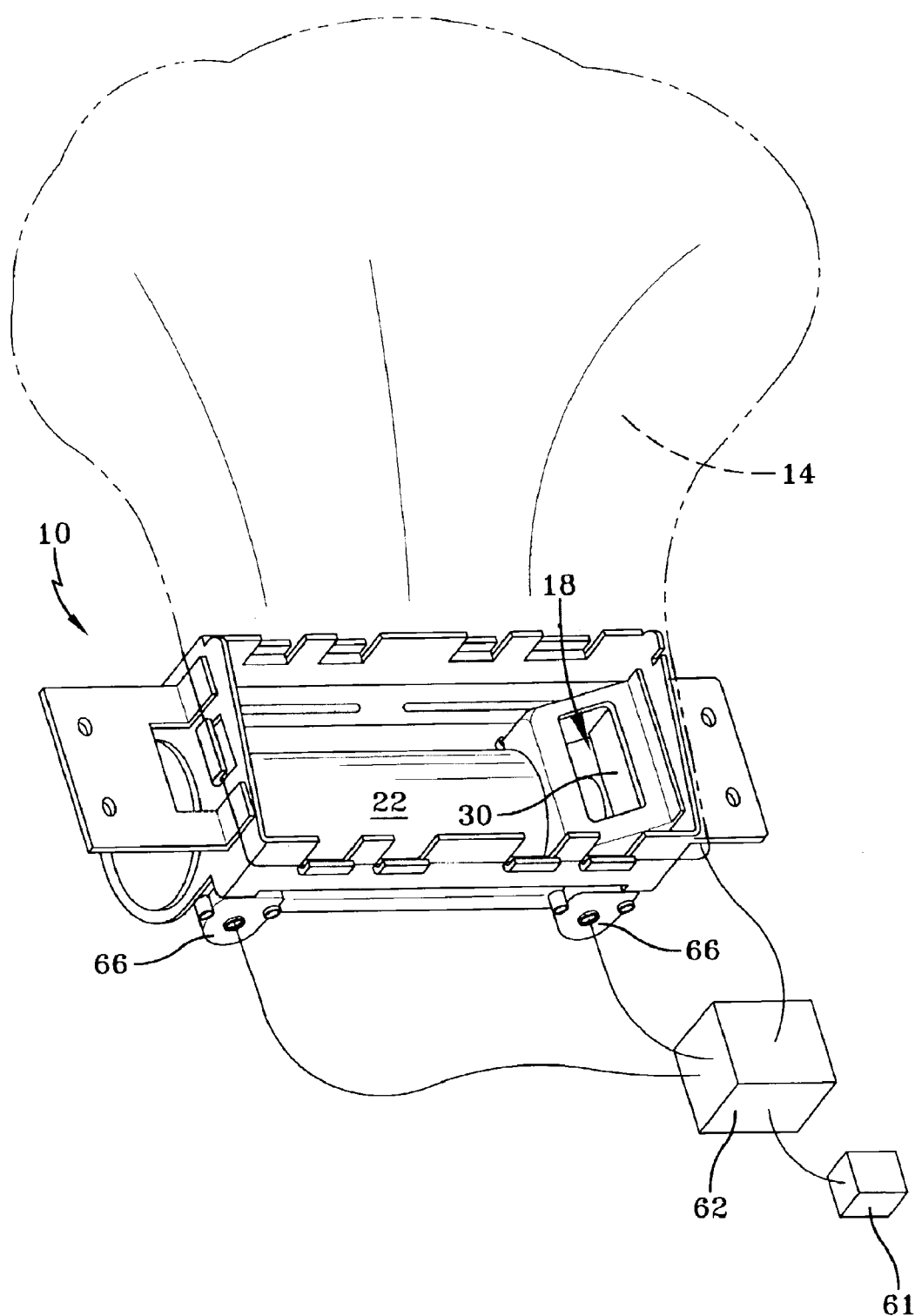
FIG. 1 illustrates an airbag module according to the present invention, including an airbag, an inflator, and a gas flow diverter.
Figure 2:
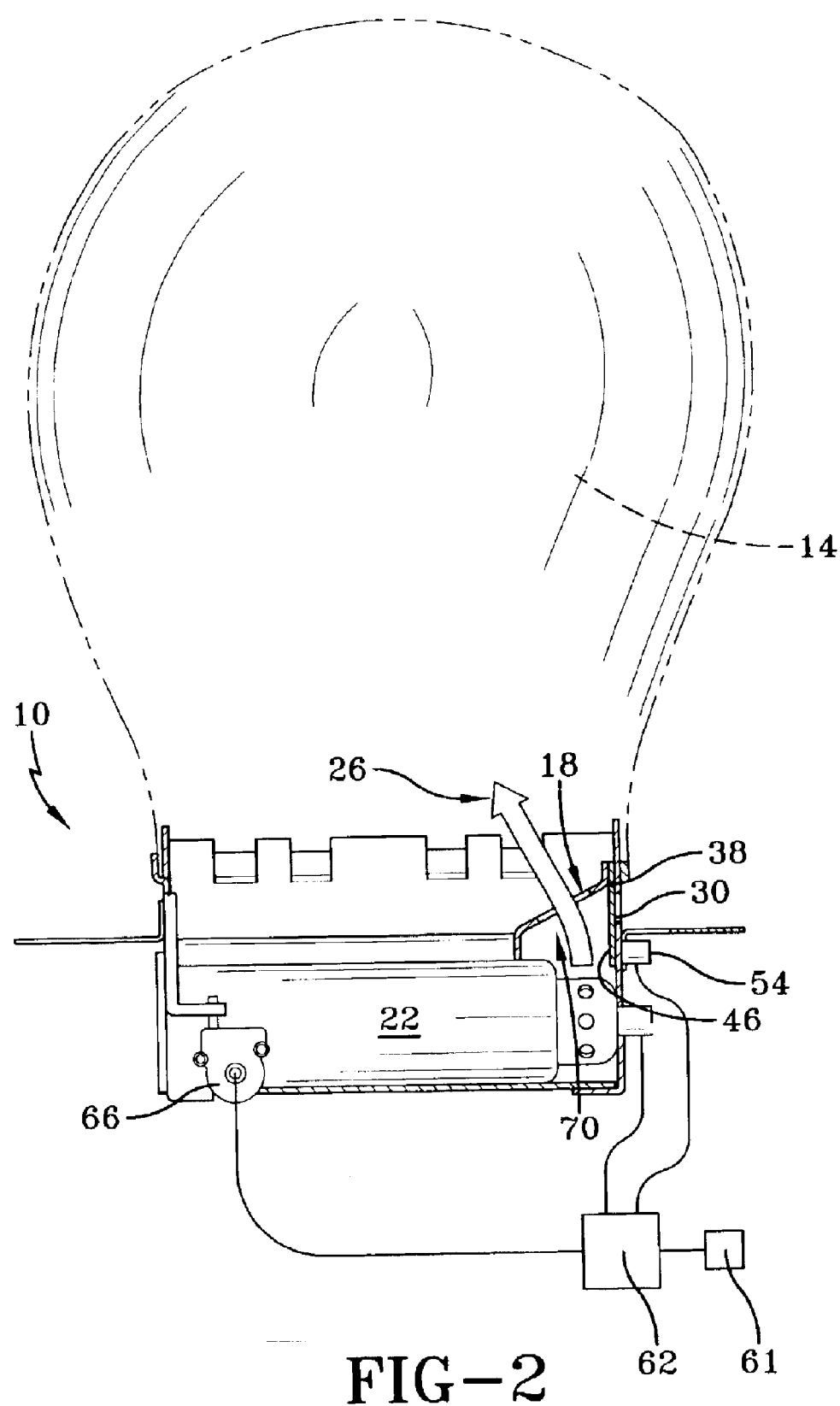
FIG. 2 illustrates the airbag module of FIG. 1 with the gas flow diverter in position to channel inflation gas to the airbag.

FIG. 1 illustrates an airbag module 10 according to the present invention. Like existing airbag modules, an airbag module 10 according to the present invention comprises airbag 14 and airbag inflator 22. An airbag inflator 22 is controlled by a control unit 62, which is in communication with a crash detection system (not shown). When a crash is detected, the airbag inflator 22 rapidly emits an inflation gas through an opening 18 into airbag 14 as shown in FIG. 2. Inflation gas 26 from the inflator 22 passes through a first passage 70 through an opening 18 into the airbag 14 to inflate the airbag 14.

Figure 3:
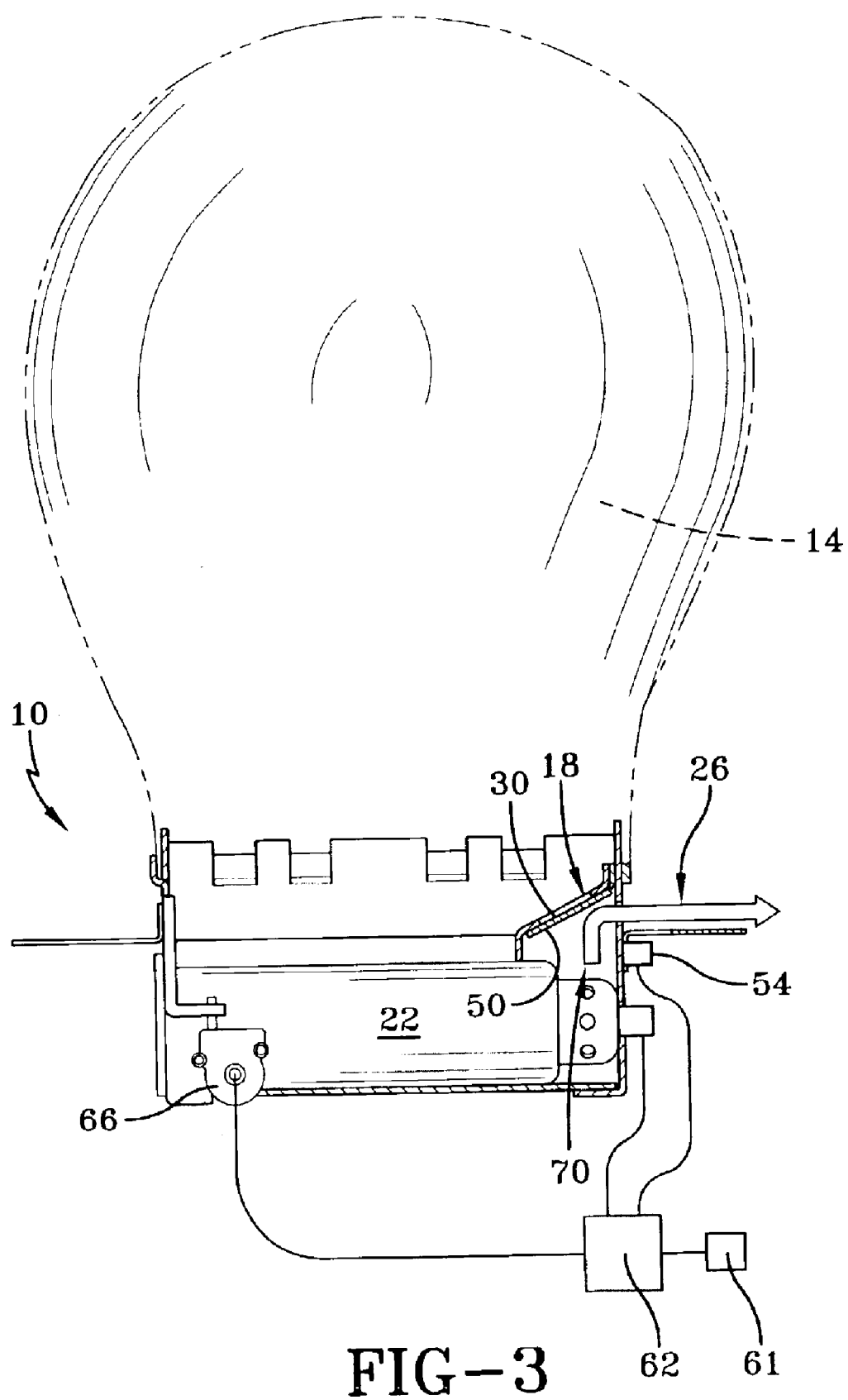
FIG. 3 illustrates the airbag module of FIG. 1 with the gas flow diverter in place to channel inflation gas away from the airbag's gas intake opening.
Figure 4:
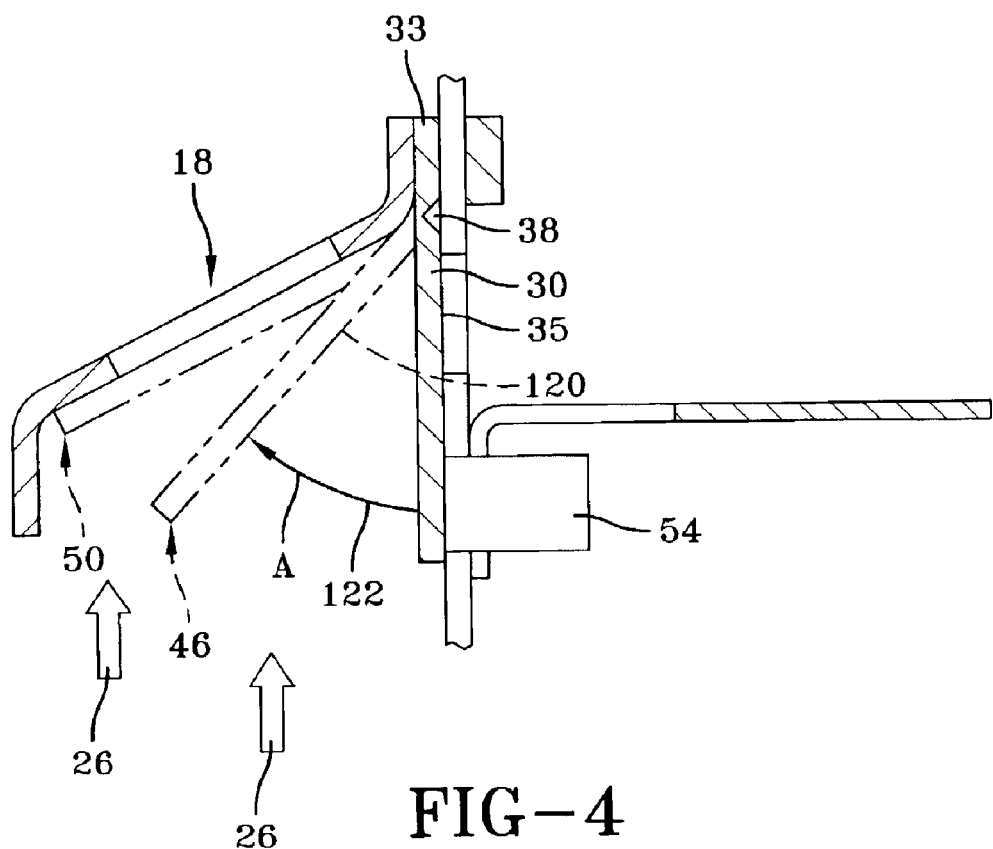
FIG. 4 illustrates the positions of the gas flow diverter.

In contrast to existing airbag modules, however, an airbag module 10 according to the present invention has a gas flow diverter 30, here a flap, having a first position 46 as shown in FIGS. 2 and 4 and a second position 50 as shown in FIGS. 3 and 4. The gas flow diverter 30 preferably comprises a metal flap having a hinge 38, here a groove across the metal flap. The hinge 38 pivotally attaches a first gas flow diverter portion 33 to a second gas flow diverter portion 35. The second gas flow diverter portion 35 is moveable between a first position 46 and a second position 50. As shown in FIGS. 3 and 4, when the airbag 14 has reached a selected inflation level, the control unit 62 controls the actuator 54, here a squib, a pyrotechnic device that produces a blast of gas to move the gas flow diverter 30 from a first position 46 indicated by an arrow A towards a second position 50. The squib 54 typically only produces enough gas to move the second gas flow diverter portion 35 to an intermediate position 120 (although it may be made to move the second gas flow diverter portion 35 all the way to the second position 50). However, since the inflation gas 26 is moving by the gas flow diverter 30 as indicated by an arrow 122 in the drawing at high pressure and speed, the inflation gas 26 causes the gas flow diverter 30 to move completely to a second position 50.

The gas flow diverter 30 deforms along a hinge 38, which is the groove in the metal flap. Because the gas flow diverter 30 comprises metal, the gas flow diverter 30 will deform and maintain a second position 50 and not flutter, thereby permitting the gas flow diverter 30 to act as a seal for the opening 18. High temperature plastics and ceramics may be used instead of metal. Once in position 50 as shown in FIGS. 3 and 4, the gas flow diverter 30 seals the opening 18 and diverts inflation gas 26 away from the opening 18. In moving from a first position 46 to a second position 50, the gas flow diverter 30 helps form a second passage 74, which communicates inflation gas 26 away from the airbag 14 and preferably behind an instrument panel (not shown) so that the inflation gas 26, which is typically very hot, is safely communicated away from the vehicle occupant. Moreover, the hinge 38 attaches a first gas flow diverter portion 33 to a second gas flow diverter portion 35 so that these portions 33, 35 will not separate when the gas flow diverter 30 is actuated.

Figure 5:
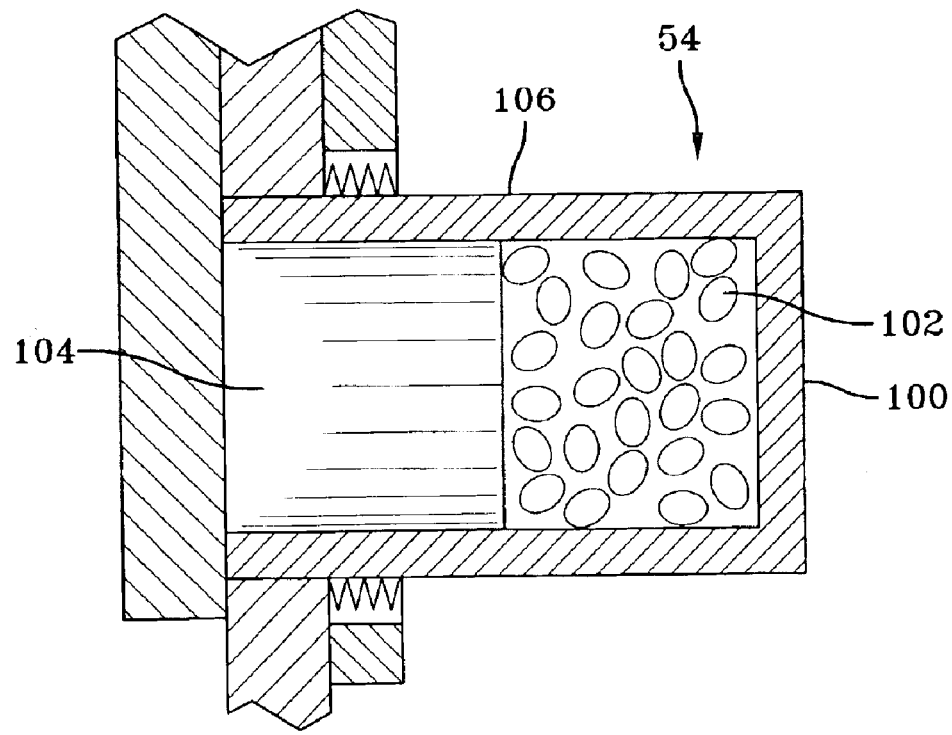
FIG. 5 illustrates a section view through a squib.

As shown in FIG. 5, the squib 54 comprises an igniter assembly 100, a gas generant 102, and an optional piston 104 that are pressed into a housing 106. When the igniter assembly 100 receives an electrical signal, it causes the generant 102 to undergo a chemical reaction that changes the generant 102 from a solid to a high-pressure gas. This gas then acts on the gas flow diverter 30 to move it from a first position 46. Additionally, a piston 104 can be added to the squib 54 so that more pressure will be built up behind piston 104 before contacting the gas flow diverter 30. In this manner less generant 102 will be required for the squib to function.

An airbag module 10 according to the present invention may further be used in conjunction with a vehicle occupant position sensor 66. As shown in FIGS. 1–3, the vehicle occupant position sensor 66 is in communication with a control unit 62. Based on the position of the vehicle occupant detected by the sensor 66, the control unit 62 determines the proper level of inflation for the airbag 14 and controls its inflation through the actuation of the gas flow diverter 30 by the actuator 54. The vehicle occupant position sensor may be a weight sensor on a seat, infrared sensors in the vehicle's cabin, an airbag cushion sensor or other known device. Thus, a portion of the inflation gas 26 from the inflator 22 may be passed to the airbag 14 while the remainder may be vented away from airbag 14 so that airbag 14 is inflated to a desirable level based on the location of the vehicle occupant.

Figure 6:
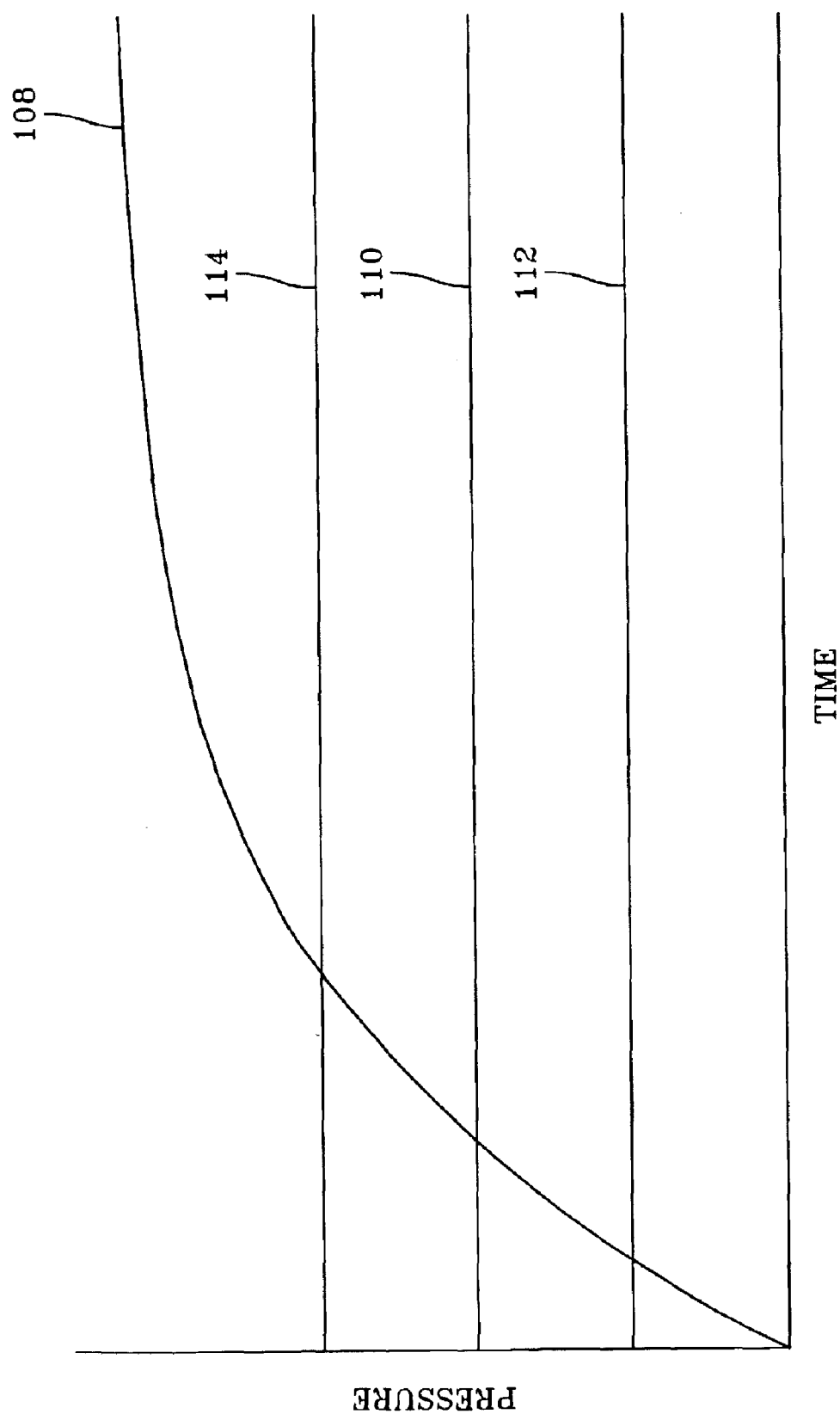
FIG. 6 illustrates various inflator pressure verses time curves that can be generated with the present invention.

Referring to FIG. 6, it may also be desirable to use the airbag module of the present invention without a sensor if a gas generating airbag inflator is employed. It is understood that an airbag module of the present invention may employ a stored gas airbag inflator, a gas generating airbag inflator, or a hybrid airbag inflator. Since a gas generating airbag inflator 22 produces gas with a chemical reaction, it is difficult to alter this reaction once it has begun. As a result, a gas generating airbag inflator can typically produce only a limited number of pressure verses time curves as represented by plot 108. The present invention offers a way to produce a wider variety of inflator pressure versus time curves as represented by 110, 112, and 114. This is accomplished by programming the control unit 62 to activate the actuator 54 at a predetermined time after the inflator 22 has begun to generate gas. This has the effect of diverting the reminder of the inflation gas away from the airbag 14 so that lower pressure verses time curves can be created from the same high output inflator. This variety of curves permit the airbag 14 to be filled to a greater variety of different levels depending upon the point in time the gas flow diverter 30 is actuated. Curve 112 shows earlier actuation of gas flow diverter 30 than curve 110, while curve 110 shows earlier actuation than curve 114, and curve 114 shows earlier actuation than curve 108. Thus, this technique for deployment of an airbag 14 permits more controlled inflation based on assessed conditions other than occupant position. For example, referring to FIG. 1, the sensor 62 may be a sensor in a seat of a vehicle that detects the weight of a vehicle occupant. Based on this information, the control unit 62 may determine the most desirable inflation level for the airbag 14 and permit the inflator 22 to fill the airbag 14 for a predetermined amount of time to reach this level and then actuate the gas flow diverter 30 to seal the opening 18 and divert the remainder of the gas from inflator 22. If the vehicle occupant weighed more, then control unit 62 would actuate the gas flow diverter 30 later in time.

The sensor 61 may be a crash severity sensor that provides the control unit 62 with information concerning the force of the crash. With greater crash severity, the control unit 62 would permit the inflator 22 to fill the airbag 14 for a longer period of time. Conversely, if the crash were less severe, then the control unit 62 would actuate the gas flow diverter 30 sooner. The invention accordingly permits a greater variety of inflation levels depending upon assessed conditions involving the vehicle crash. In each instance, one single stage inflator 22 may be employed to provide a variety of inflation levels of an airbag 14 thereby saving significant costs.

The control unit 62 could be programmed to deploy the gas flow diverter 30 at a predetermined time without any data from an occupant detection system. This would be desirable when it is necessary to change the pressure verses time curve for an aggressive inflator as represented by curve 108. If it is known that a curve represented by curve 110 was desirable, the controller could be programmed to automatically fire the actuator 54 at a predetermined time to achieve curve 110.

Figure 7:
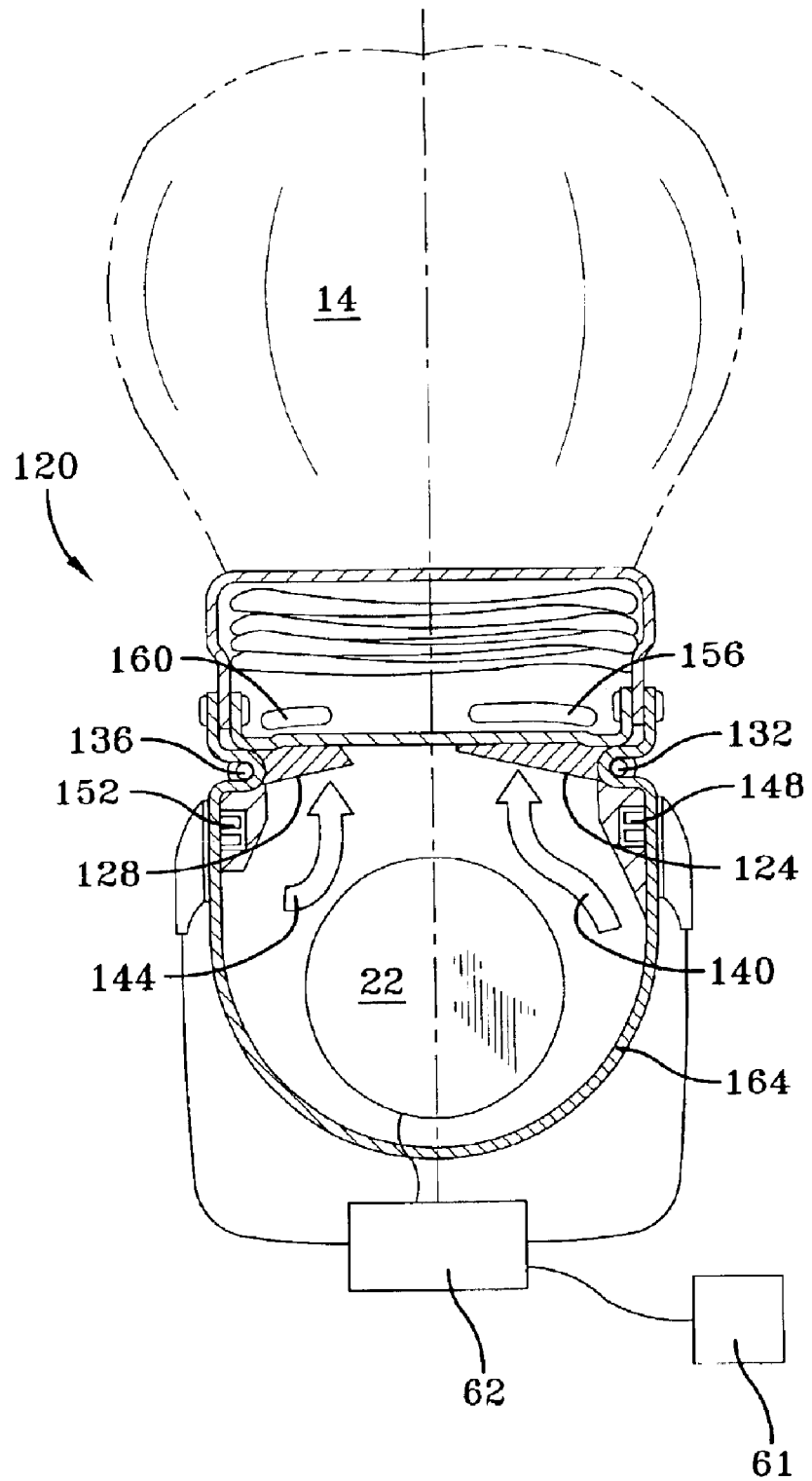
FIG. 7 illustrates another version of an airbag module according to the present invention.

FIG. 7 illustrates another version of an airbag module 120 according to the present invention. The airbag 14 receives inflation gas from the inflator 22 as previously described. Here, two gas flow diverters 124, 128 pivot along hinges 132, 136 as indicated by the arrows 140, 144 when moved by the actuators 148, 152, respectively. The control unit 62 controls actuation of the actuators 148, 152 based on information received from the sensor 61 or another sensor. Following actuation, the gas flow diverter 124 opens a vent 156 of airbag 14 while the gas flow diverter 128 opens a vent 160. Remaining inflation gas emitted from the inflator 22 is then diverted from the vents 124, 156 into the surrounding environment.

Moreover, the gas flow diverters 124, 128 may be employed with a third gas flow diverter 30 so that three gas flow diverters may be actuated to open three vents of airbag 14. Each gas flow diverter 124, 128 and 30 may be individually or in combination controlled to permit greater control of inflation of the airbag 14. For example, one gas flow diverter 124 may be left unactuated while another gas flow diverter 128 is actuated, leaving a first opening 154 unsealed and a second opening 160 sealed to permit the airbag 14 to bleed inflation gas during inflation and during cushioning through the first opening 154. The airbag 14 would then be softer than if both openings 154, 160 were sealed or if the second opening 160 were left open and the first opening 156 closed. The invention thus permits the airbag 14 to provide an increased variety of deployment and cushioning levels.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. An airbag module comprising:
   an airbag inflatable through an opening;
   an airbag inflator for communicating an inflation gas into said opening;
   a flap in communication with said airbag inflator for selectively directing the inflation gas away from said opening, said flap having a hinge and being movable between a first position and a second position, said first position permitting the inflation gas to flow freely to said opening and in said second position said flap is interposed between the inflator and said opening such that the flap deflects inflation gas away from said opening;
   an actuator selectively moving said flap between said first position and said second position;
   a control unit controlling said actuator; and
   a sensor in communication with said control unit.

2. The airbag module of claim 1 wherein said flap comprises a gas flow diverter.

3. The airbag module of claim 1 wherein said actuator comprises a pyrotechnic device.

4. The airbag module of claim 1 wherein said airbag inflator assists in moving said flap between said first position and said second position.

5. The airbag module of claim 1 wherein said hinge resists movement of said flap.

6. The airbag module of claim 1 wherein said hinge comprises a deformable material.

7. The airbag module of claim 1 wherein said flap comprises a first portion and a second portion, said hinge holding said first portion to said second portion.

8. The airbag module of claim 1 wherein said flap does not separate into two or more pieces during actuation.

9. The airbag module of claim 1 including another opening for said airbag and another flap in communication with said airbag inflator for selectively directing the inflation gas away from said another opening.

10. The airbag module of claim 1 wherein said flap directs the inflation gas outside of said airbag.

11. An airbag module comprising:
    an airbag inflatable through an opening;
    an airbag inflator selectively in communication with a first passage and a second passage, said first passage directed toward said opening and said second passage directed away from said opening;
    a gas flow diverter in communication with said airbag inflator, having a first position and a second position, said first position placing the gas flow diverter between the inflator and said first passage and said second position placing the gas flow diverter between the inflator said second passage;
    an actuator comprising a pyrotechnic device for moving said gas flow diverter between said first position and said second position, said first position permitting the inflation gas to flow to said opening and in said second position said gas flow diverter deflects inflation gas away from said opening, said gas flow diverter comprising a flap having a hinge;
    a sensor; and
    a control unit in communication with said sensor, controlling said actuator.

12. The airbag module of claim 11 including a piston in communication with said pyrotechnic device.

13. An airbag module, comprising:
    an airbag inflatable through a first opening a second opening;
    an airbag inflator for communicating an inflation gas into said first opening and said second opening;
    a first block in communication with said airbag inflator for selectively directing the inflation gas away from said first opening; and
    a second block in communication with said airbag inflator for selectively directing the inflation gas away from said second opening.

14. The airbag module of claim 13 wherein said first opening is a different size from said second opening.

15. The airbag module of claim 14 wherein said first opening is smaller than said second opening.

16. The airbag module of claim 13 including a first actuator selectively moving said first block and a second actuator selectively moving said second block.

17. The airbag module of claim 16 including a control unit controlling said first actuator and said second actuator.

18. The airbag module of claim 17 wherein said control unit controls said first actuator to actuate said first block independently from said second actuator.

19. The airbag module of claim 13 including a third opening for said airbag and a third block in communication with said inflator.

* * * * *